US012503044B2

(12) United States Patent
Bandi et al.

(10) Patent No.: US 12,503,044 B2
(45) Date of Patent: Dec. 23, 2025

(54) SYSTEM AND METHOD OF PROVIDING MARSHALING STATUS VIA VEHICLE EXTERIOR LIGHTS

(71) Applicant: Ford Global Technologies, LLC, Dearborn, MI (US)

(72) Inventors: Krishna Bandi, Farmington Hills, MI (US); Meghna Menon, Ann Arbor, MI (US); Somak Datta Gupta, Novi, MI (US); Gregory P. Linkowski, Dearborn, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 18/455,372

(22) Filed: Aug. 24, 2023

(65) Prior Publication Data

US 2025/0065804 A1 Feb. 27, 2025

(51) Int. Cl.
*B60Q 1/50* (2006.01)
*B60W 50/02* (2012.01)
*B60W 60/00* (2020.01)
*H04W 4/44* (2018.01)

(52) U.S. Cl.
CPC ......... *B60Q 1/543* (2022.05); *B60W 50/0205* (2013.01); *B60W 60/001* (2020.02); *H04W 4/44* (2018.02); *B60W 2556/45* (2020.02)

(58) Field of Classification Search
CPC . B60Q 1/543; B60W 50/0205; B60W 60/001; B60W 2556/45; G08G 1/0125; H04W 4/44; H04W 4/40; H04W 4/06; H04W 4/38
See application file for complete search history.

(56) References Cited

U.S. PATENT DOCUMENTS 10,081,334 B1  9/2018  Chen et al.
10,569,849 B2  2/2020  Stone et al.
(Continued)

FOREIGN PATENT DOCUMENTS

CN   111210618 A  *  5/2020   ........... G08G 1/0104
CN   113525397      10/2021
(Continued)

OTHER PUBLICATIONS

CN-111210618-A translation (Year: 2020).*
(Continued)

*Primary Examiner* — Kyle T Johnson
(74) *Attorney, Agent, or Firm* — Burris Law, PLLC (57) ABSTRACT

A method of wirelessly communicating status information of one or more vehicles with one or more infrastructures including the receipt of an onboarding process trigger based on a current status associated with a pre-onboarding process of the one or more vehicles, the determination of a current status associated with an onboarding process of the one or more vehicles based on the onboarding process trigger and an autonomous vehicle marshaling algorithm, and the output of an indication corresponding to the current status associated with the onboarding process of the one or more vehicles via exterior lights of the one or more vehicles to the one or more infrastructures or one or more human operators.

20 Claims, 7 Drawing Sheets

(56) References Cited

U.S. PATENT DOCUMENTS

| | | | |
|---|---|---|---|
| 11,659,284 B2* | 5/2023 | Oshima | H04B 10/116 348/362 |
| 2005/0187677 A1 | 8/2005 | Walker et al. | |
| 2006/0025907 A9 | 2/2006 | Kapolka et al. | |
| 2006/0026017 A1 | 2/2006 | Walker et al. | |
| 2007/0079012 A1 | 4/2007 | Walker et al. | |
| 2013/0200223 A1 | 8/2013 | Alexander et al. | |
| 2018/0061243 A1 | 3/2018 | Shloosh et al. | |
| 2019/0020985 A1 | 1/2019 | Dai et al. | |
| 2019/0225142 A1* | 7/2019 | Switkes | B60Q 1/507 |
| 2020/0164770 A1* | 5/2020 | Lee | B60Q 1/5035 |
| 2020/0364953 A1* | 11/2020 | Simoudis | G06N 20/00 |
| 2021/0075594 A1* | 3/2021 | Hassani | G06Q 10/02 |
| 2022/0135228 A1* | 5/2022 | Morrison | G05D 1/652 701/3 |
| 2022/0176999 A1* | 6/2022 | Golgiri | B60W 60/0023 |
| 2022/0185299 A1* | 6/2022 | Ye | B60W 60/00186 |
| 2023/0145508 A1* | 5/2023 | Kaphengst | G05B 19/4155 701/24 |
| 2023/0166769 A1* | 6/2023 | Valasek | B60W 60/0025 701/23 |
| 2023/0308872 A1* | 9/2023 | Urhahne | G08G 1/096844 |
| 2024/0010220 A1* | 1/2024 | Kim | G07C 5/06 |
| 2024/0036567 A1* | 2/2024 | Moser | G05D 1/0038 |
| 2024/0182070 A1* | 6/2024 | Bandi | G08G 1/096725 |
| 2024/0185724 A1* | 6/2024 | Bandi | G08G 1/22 |
| 2025/0065804 A1* | 2/2025 | Bandi | H04W 4/40 |
| 2025/0118114 A1* | 4/2025 | Bandi | H04W 4/44 |

FOREIGN PATENT DOCUMENTS

| | | | | |
|---|---|---|---|---|
| CN | 119521167 A | * | 2/2025 | G08G 1/0125 |
| DE | 102012005012 A1 | * | 9/2012 | H04L 67/12 |
| KR | 101770642 B1 | * | 9/2017 | B60Q 1/085 |
| WO | 2019130280 | | 8/2019 | |

OTHER PUBLICATIONS

KR-101770642-B1 translation (Year: 2017).*
Automated_Vehicle_Marshalling_The_First_Functionally_Safe_V2X_Service_for_Connected (Year: 2025).*
Embotech_website (Year: 2025).*
PC5-Based_Cellular-V2X_Evolution_and_Deployment (Year: 2021).*
CN-119521167-A translation (Year: 2025).*
DE-102012005012-A1 translation (Year: 2012).*

* cited by examiner

SYSTEM AND METHOD OF PROVIDING MARSHALING STATUS VIA VEHICLE EXTERIOR LIGHTS

FIELD

The present disclosure relates to wireless communication between one or more vehicles and one or more infrastructures. More specifically, the present disclosure relates to wireless communication between one or more vehicles and one or more infrastructures to provide status notifications with the exterior lights of the vehicle.

BACKGROUND

The statements in this section merely provide background information related to the present disclosure and may not constitute prior art.

In a vehicle marshaling environment, vehicles are connected to an infrastructure so that the infrastructure may monitor the vehicle as it progresses through a facility. However, issues may arise in the connection between the infrastructure and the vehicles. In the instance wherein such an issue does arise, it can be difficult to properly diagnose the issue in a timely manner that would prevent traffic congestion for example. The present disclosure addresses these and other issues related to marshaling vehicles.

SUMMARY

This section provides a general summary of the disclosure and is not a comprehensive disclosure of its full scope or all of its features.

The present disclosure provides a method of wirelessly communicating status information of one or more vehicles with one or more infrastructures, the method comprising: receiving, based on a current status associated with a pre-onboarding process of the one or more vehicles, an onboarding process trigger; determining, based on the onboarding process trigger and an autonomous vehicle marshaling algorithm, a current status associated with an onboarding process of the one or more vehicles; and outputting, via exterior lights of the one or more vehicles to the one or more infrastructures or one or more human operators, an indication corresponding to the current status associated with the onboarding process of the one or more vehicles; wherein the current status associated with the pre-onboarding process indicates one or more of a wireless connectivity status, a provisioning status, or a pre-onboarding status; wherein the current status associated with the onboarding process indicates one or more of a wireless connectivity status, a blinking code sequence, or an onboarding status confirmation; wherein the autonomous vehicle marshaling algorithm used in determining the current status associated with the onboarding process is configured to perform one or more diagnostic processes, wherein the one or more diagnostic processes is a blinking code sequence, a vehicle wireless connectivity check and status, a vehicle on-boarding initialization readiness check, an AVM feature activation process, or a combination thereof; further comprising: receiving, from a server, a pre-onboarding process trigger; determining, based on the pre-onboarding process trigger and the autonomous vehicle marshaling algorithm, a current status associated with a pre-onboarding process of the one or more vehicles, wherein the autonomous vehicle marshaling algorithm used in determining the current status associated with the pre-onboarding process is configured to perform one or more diagnostic processes, wherein the one or more diagnostic processes is a vehicle provisioning of vehicular modules, a wireless connectivity check and status, an onboarding readiness check of vehicle CAN modules, an AVM feature activation process, or a combination thereof; and outputting, via the exterior lights of the one or more vehicles to the one or more infrastructures, an indication corresponding to the current status associated with the pre-onboarding process of the one or more vehicles; further comprising: halting, based on one or more faults associated with the one or more vehicles, navigation of the one more vehicles toward a waypoint, wherein the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and the autonomous vehicle marshaling CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles with a server, or a combination thereof; and outputting, via the exterior lights of the one or more vehicles to the one or more infrastructures based on the one or more faults, an indication corresponding to a current status associated with the one or more faults; further comprising: receiving, based on the one or more faults, a re-onboarding process trigger; determining, based on the re-onboarding process trigger and an autonomous vehicle marshaling algorithm, a current status associated with a re-onboarding process of the one or more vehicles; and outputting, via the exterior lights of the one or more vehicles to the one or more infrastructures, an indication corresponding to the current status associated with the re-onboarding process of the one or more vehicles; further comprising: receiving, from a server, an offboarding process trigger; determining, based on the offboarding process trigger and an autonomous vehicle marshaling algorithm, a current status associated with an off-boarding process of the one or more vehicles; and outputting, via the exterior lights of the one or more vehicles to the one or more infrastructures, an indication corresponding to the current status associated with the offboarding process of the one or more vehicles; wherein the autonomous vehicle marshaling algorithm used in determining the current status associated with the offboarding process is configured to perform a wireless connectivity check and status, an off-boarding readiness check of vehicle CAN modules, an AVM feature deactivation process, or a combination thereof; wherein the indication is a visual cue that corresponds to a current status associated with the onboarding process, a pre-onboarding process, a re-onboarding process, or an offboarding process of the one or more vehicles, wherein the visual cue includes a pre-defined pattern of a plurality of patterns.

The present disclosure provides a method of marshaling one or more autonomously operated vehicles, the method comprising: broadcasting, to one or more vehicles, an onboarding process trigger associated with marshaling the one or more autonomously operated vehicles; discerning, based on the onboarding process trigger and an autonomous vehicle marshaling algorithm, an indication corresponding to a current status associated with an onboarding process of the one or more autonomously operated vehicles, wherein the indication is outputted via exterior lights of the one or more autonomously operated vehicles to one or more infrastructures or one or more human operators; and causing, based on the indication, the one or more autonomously operated vehicles to navigate toward a waypoint; wherein the current status associated with the onboarding process indicates one or more of a wireless connectivity status, a blinking code sequence, or an onboarding status confirmation; further comprising: broadcasting, to the one or more autonomously operated vehicles, a pre-onboarding process trigger; discerning, based on the pre-onboarding process trigger and the autonomous vehicle marshaling algorithm, an indication corresponding to a current status associated with a pre-onboarding process of the one or more autonomously operated vehicles, wherein the indication is outputted via the exterior lights of the one or more autonomously operated vehicles to the one or more infrastructures; wherein the current status associated with the pre-onboarding process indicates one or more of a wireless connectivity status, a provisioning status, or a pre-onboarding status; further comprising: determining one or more faults associated with the one or more autonomously operated vehicles, wherein the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and the autonomous vehicle marshaling CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles with a server, or a combination thereof; and causing, based on the one or more faults, the one or more autonomously operated vehicles to halt navigation toward the waypoint; further comprising: broadcasting, based on the one or more faults, a re-onboarding process trigger; and discerning, based on the re-onboarding process trigger and the autonomous vehicle marshaling algorithm, an indication corresponding to a current status associated with a re-onboarding process of the one or more autonomously operated vehicles, wherein the indication is outputted via the exterior lights of the one or more autonomously operated vehicles to the one or more infrastructures; further comprising: broadcasting an offboarding process trigger; and discerning, based on the offboarding process trigger and the autonomous vehicle marshaling algorithm, an indication corresponding to a current status associated with an offboarding process of the one or more autonomously operated vehicles, wherein the indication is outputted via the exterior lights of the one or more autonomously operated vehicles to the one or more infrastructures; wherein the broadcasted onboarding process trigger is sent via a short-range wireless communication method; further comprising: determining, one or more faults associated with the one or more autonomously operated vehicles with a server; and re-broadcasting, to the one or more infrastructures based on the one or more faults, one or more signals from the one or more autonomously operated vehicles via a long-range wireless communication method, wherein the one or more signals is the onboarding process trigger, a pre-onboarding process trigger, a re-onboarding process trigger, or an offboarding process trigger.

The present disclosure provides a system for wirelessly communicating status information of one or more vehicles with one or more infrastructures, the system comprising: the one or more vehicles configured to: receive, based on a current status associated with a pre-onboarding process of the one or more vehicles, an onboarding process trigger, determine, based on the onboarding process trigger and an autonomous vehicle marshaling algorithm, a current status associated with an onboarding process of the one or more vehicles, and output, via exterior lights of the one or more vehicles to the one or more infrastructures or one or more human operators, an indication corresponding to the current status associated with the onboarding process of the one or more vehicles; and a server configured to: broadcast, to the one or more vehicles, the onboarding process trigger associated with marshaling the one or more vehicles, discern, based on the onboarding process trigger and the autonomous vehicle marshaling algorithm, an indication corresponding to the current status associated with an onboarding process of the one or more vehicles, wherein the indication is outputted via the exterior lights of the one or more vehicles to the one or more infrastructures, and cause, based on the indication, the one or more vehicles to navigate toward a waypoint.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for a vehicle to wirelessly communicate with at least one infrastructure to provide one or more visual notifications (e.g., marshaling status notification) via the exterior lights of the vehicle. For example, the vehicle may be programmed to communicate any status of the vehicle's current state to the infrastructure, such as onboarding, re-onboarding, offboarding, or other information, such as any error that may affect the vehicle (e.g., movement of the vehicle). An advantage of such an ability for the vehicle to wirelessly communicate the vehicle's status via the vehicle exterior lights is to mitigate the frequency of false triggers that result in emergency stops, thereby reducing the unnecessary disruption of a manufacturing process flow.

Figure 1:
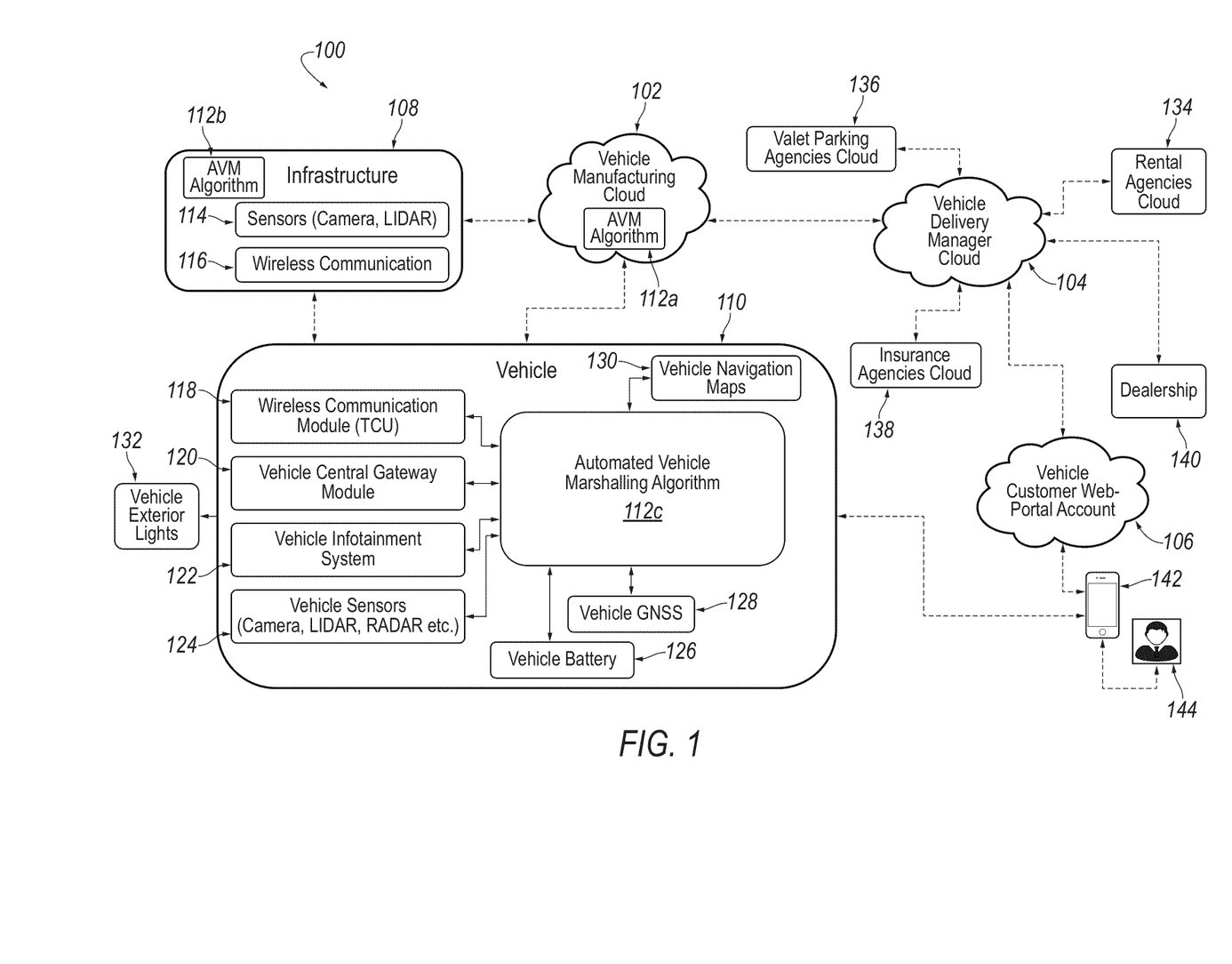
FIG. 1 illustrates a general system for autonomous vehicle marshaling in accordance with various implementations.

FIG. 1 shows a schematic block diagram illustration of an autonomous vehicle marshaling (AVM) system 100. The AVM system 100 in one or more examples marshals one or more vehicles traveling at a low speed. However, it is understood that the AVM system 100 may marshal one or more vehicles traveling at any speed. It is also understood that the AVM system 100 may marshal semi-autonomous vehicles and/or fully autonomous vehicles.

The AVM system 100 generally includes a vehicle manufacturing cloud 102, a vehicle delivery manager cloud 104, a vehicle customer web-portal account 106, an infrastructure 108, and a vehicle 110. The vehicle manufacturing cloud 102 operates as the central cloud system that manages and/or facilitates any manufacturing process associated with the vehicle 110. The vehicle manufacturing cloud 102 wirelessly communicates with the vehicle delivery manager cloud 104 and the infrastructure 108. The vehicle manufacturing cloud 102 also wirelessly communicates with the vehicle 110 directly.

The vehicle manufacturing cloud 102 includes an AVM algorithm 112a. The AVM algorithm 112a processes status information associated with at least the vehicle 110 of the one or more vehicles. It is understood that the AVM algorithm 112a processes status information associated with each vehicle of the one or more vehicles (e.g., the vehicle 110). The vehicle manufacturing cloud 102 is configured to cause the infrastructure 108 to monitor the progression of the one or more vehicles (i.e., the vehicle 110) as the vehicle(s) progress through a factory floor or parking lot, for example. The vehicle manufacturing cloud 102 is also configured to cause the infrastructure 108 to communicate with the one or more vehicles. For example, the vehicle manufacturing cloud 102 utilizes the AVM algorithm 112a to send instructions to the infrastructure 108 and/or to process information received from the infrastructure 108. The vehicle manufacturing cloud 102 is configured to cause the vehicle delivery manager cloud 104 to facilitate a delivery of the one or more vehicles (i.e., the vehicle 110) to various locations. For example, the vehicle manufacturing cloud 102 utilizes the AVM algorithm 112a to send instructions to the vehicle delivery manager cloud 104 and/or to process information received from the vehicle delivery manager cloud 104.

The vehicle manufacturing cloud 102 is also configured to cause the one or more vehicles to start, stop, or pause progression through a factory floor or parking lot, for example. The vehicle manufacturing cloud 102 is further configured to control a marshaling speed of the one or more vehicles as the one or more vehicles travel across through the factory floor or parking lot, for example. For example, the vehicle 110 utilizes the AVM algorithm 112a to send instructions to the vehicle 110 and/or to process information received from the vehicle 110.

The infrastructure 108 includes the AVM algorithm 112b, one or more sensors 114, and a sensor component 116. The sensor component 116 provides for communication between one or more infrastructures (e.g., the infrastructure 108) and the one or more vehicles. For example, the sensor component 116 may utilize GPS, Wi-Fi, satellite, 3G/4G/5G, and/or Bluetooth™ to communicate with the one or more vehicles. The sensor component 116 also communicates with the one or more sensors 114, such as, for example, one or more of cameras, lidar, radar, and/or ultrasonic devices. The one or more sensors 114 monitor the movement of the one or more vehicles as the vehicle(s) move through, for example, a factory floor or parking lot. As an example, the infrastructure 108 utilizes the AVM algorithm 112b to process and send information to the vehicle manufacturing cloud 102 and/or to process information received from the vehicle manufacturing cloud 102. As another example, the infrastructure 108 utilizes the AVM algorithm 112b to process and send information directly to the vehicle 110 and/or to process information received from the vehicle 110. It is understood that the infrastructure 108 can forward instructions received from the vehicle manufacturing cloud 102 to the vehicle 110. However, it is also understood that the infrastructure 108 can send instructions to the vehicle 110.

The vehicle 110 includes an AVM algorithm 112c, a wireless transmission module 118, a vehicle central gateway module 120, a vehicle infotainment system 122, one or more vehicle sensors 124, a vehicle battery 126, a vehicle global navigation satellite system 128, vehicle navigation maps 130, and vehicle exterior lights 132. The wireless transmission module 118 may be a transmission control unit. The wireless transmission module 118 includes one or more sensors that are configured to gather data and send signals to other components of the vehicle 110. The one or more sensors of the wireless transmission module 118 may include a vehicle speed sensor (not shown) configured to determine a current speed of the vehicle 110; a wheel speed sensor (not shown) configured to determine if the vehicle 110 is traveling at an incline or a decline; a throttle position sensor (not shown) determines if a downshift or upshift of one or more gears associated with the vehicle 110 is required in a current status of the vehicle 110; and/or a turbine speed sensor (not shown) configured to send data associated with a rotational speed of a torque converter of the vehicle 110. The wireless transmission module 118 communicates information, gathered by the one or more sensors, to the AVM algorithm 112c. For example, the vehicle 110 utilizes the AVM algorithm 112c to process and send information gathered by the one or more sensors to the infrastructure 108. As another example, the vehicle 110 utilizes the AVM algorithm 112c to process and send information gathered by the one or more sensors to the vehicle manufacturing cloud 102 directly. The AVM algorithm 112c is configured to communicate information and/or instructions to the wireless transmission module 118 received from the infrastructure 108 and/or the vehicle manufacturing cloud 102.

The vehicle central gateway module 120 operates as an interface between various vehicle domain bus systems, such as an engine compartment bus (not shown), an interior bus (not shown), an optical bus for multimedia (not shown), a diagnostic bus for maintenance (not shown), or a CAN bus. The vehicle central gateway module 120 is configured to distribute data communicated to the vehicle central gateway module 120 by each of the various domain bus systems to other components of the vehicle 110. The vehicle central gateway module 120 is also configured to distribute information received from the AVM algorithm 112c to the various domain bus systems. The vehicle central gateway module 120 is further configured to send information to the AVM algorithm 112c received from the various domain bus systems. For example, the vehicle 110 utilizes the AVM algorithm 112c to process and send information received from the vehicle central gateway module 120 to the infrastructure 108. As another example, the vehicle 110 utilizes the AVM algorithm 112c to process and send information received from the vehicle central gateway module 120 to the vehicle manufacturing cloud 102 directly. The AVM algorithm 112c is configured to communicate information and/or instructions to the vehicle central gateway module 120 received from the infrastructure 108 and/or the vehicle manufacturing cloud 102.

The vehicle infotainment system 122 is a system that delivers a combination of information and entertainment content and/or services to a user 144 of the vehicle 110. It is understood that the vehicle infotainment system 122 can deliver only entertainment content to the user 144 of the vehicle 110 in some examples. It is also understood that the vehicle infotainment system 122 can deliver only information services to the user 144 of the vehicle 110 in some examples. As an example, the vehicle infotainment system 122 includes built-in car computers that combine one or more functions, such as digital radios, built-in cameras, and/or televisions. The vehicle infotainment system 122 communicates information associated with the built-in car computers or processors to the AVM algorithm 112c. For example, the vehicle 110 utilizes the AVM algorithm 112c to process and send information received from the vehicle infotainment system 122 to the infrastructure 108. As another example, the vehicle 110 utilizes the AVM algorithm 112c to process and send information received from the vehicle infotainment system 122 to the vehicle manufacturing cloud 102 directly. The AVM algorithm 112c is configured to communicate information and/or instructions to the vehicle infotainment system 122 received from the infrastructure 108 and/or the vehicle manufacturing cloud 102.

The one or more vehicle sensors 124 may be, for example, one or more of cameras, lidar, radar, and/or ultrasonic devices. For example, ultrasonic devices utilized as the one or more vehicle sensors 124 emit a high frequency sound wave that hits an object (e.g., a wall or another vehicle) and is then reflected back to the vehicle 110. Based on the amount of time it takes for the sound wave to return to the vehicle 110, the vehicle 110 can determine the distance between the one or more vehicle sensors 124 and the object. As another example, camera devices utilized as the one or more vehicle sensors 124 provide a visual indication of a space around the vehicle 110. As an additional example, radar devices utilized as the one or more vehicle sensors 124 emit electromagnetic wave signals that hit the object and is then reflected back to the vehicle 110. Based on the amount of time it takes for the electromagnetic waves to return to the vehicle 110, the vehicle 110 can determine a range, velocity, and angle of the vehicle 110 relative to the object.

The one or more vehicle sensors 124 communicate information associated with the position and/or distance at which the vehicle 110 is relative to the object to the AVM algorithm 112c. For example, the vehicle 110 utilizes the AVM algorithm 112c to process and send information received from the one or more vehicle sensors 124 to the infrastructure 108. As another example, the vehicle 110 utilizes the AVM algorithm 112c to process and send information received from the one or more vehicle sensors 124 to the vehicle manufacturing cloud 102 directly. The AVM algorithm 112c is configured to communicate information and/or instructions to the one or more vehicle sensors 124 received from the infrastructure 108 and/or the vehicle manufacturing cloud 102.

The vehicle battery 126 is controlled by a battery management system (not shown) that provides instructions to the vehicle battery 126. For example, the battery management system provides instructions to the vehicle battery 126 based on a temperature of the vehicle battery 126. The battery management system ensures acceptable current modes of the vehicle battery 126. For example, the acceptable current modes protect against overvoltage, overcharge, and/or overheating of the vehicle battery 126. As another example, the temperature of the vehicle battery 126 indicates to the battery management system whether any of the acceptable current modes are within acceptable temperate ranges. The battery management system associated with the vehicle battery 126 communicates information associated with the temperature of the vehicle battery 126 to the AVM algorithm 112c. For example, the vehicle 110 utilizes the AVM algorithm 112c to process and send information received regarding the vehicle battery 126 to the infrastructure 108. As another example, the vehicle 110 utilizes the AVM algorithm 112c to process and send information regarding the vehicle battery 126 to the vehicle manufacturing cloud 102 directly. The AVM algorithm 112c is configured to communicate information and/or instructions to the vehicle battery 126 received from the infrastructure 108 and/or the vehicle manufacturing cloud 102.

The vehicle GNSS 128 is configured to communicate with satellites so that the vehicle 110 can determine a specific location of the vehicle 110. The vehicle navigation maps 132 can display, via a display screen (not shown), the specific location of the vehicle 110 to the user 144. The vehicle GNSS 128 communicates geographical information associated with the vehicle 110 to the AVM algorithm 112c. For example, the vehicle 110 utilizes the AVM algorithm 112c to process and send information received from the vehicle GNSS 128 to the infrastructure 108. As another example, the vehicle 110 utilizes the AVM algorithm 112c to process and send information from the vehicle GNSS 128 to the vehicle manufacturing cloud 102 directly. The AVM algorithm 112c is configured to communicate information and/or instructions to the vehicle GNSS 128 received from the infrastructure 108 and/or the vehicle manufacturing cloud 102. As another example, the vehicle 110 utilizes the AVM algorithm 112c to process and send information associated with the vehicle navigation maps 130 to the infrastructure 108. As another example, the vehicle 110 utilizes the AVM algorithm 112c to process and send information from the vehicle navigation maps 132 to the vehicle manufacturing cloud 102 directly. The AVM algorithm 112c is configured to communicate information and/or instructions to the vehicle navigation maps 130 received from the infrastructure 108 and/or the vehicle manufacturing cloud 102.

The vehicle exterior lights 132 can include one or more lights that are embedded around a perimeter of the vehicle 110. For example, the vehicle exterior lights 132 include, but are not limited to, low-beam headlamps, high-beam headlamps, park lights, daytime running lights, fog lights, signal lights, side marker lights, cab lights, taillights, brake lights, center mouth brake lights, and/or reverse lights. The vehicle exterior lights 132 are configured to turn ON and OFF automatically based on an exterior weather condition. The vehicle exterior lights 132 are also configured to turn ON and OFF automatically based on brightness of a light adjacent to the vehicle 110, such as sunlight, artificial light, and/or an absence of light and/or a reduction in the light. The vehicle exterior lights 132 are further configured to turn ON and OFF manually by the user 144. Additionally, the vehicle exterior lights 132 are configured to turn ON and OFF in a pattern to provide visual notification or information, such as indicative of one or more faults. For example, the one or more faults include a failure associated with a pre-onboarding status, an onboarding status, an AVM feature activation, a vehicle key detection, a blinking challenge, a vehicle GNSS time synchronization, an onboarding readiness check, vehicle security certifications, a re-onboarding status, an offboarding status, a wireless connection between the vehicle 110 and a roadside unit (RSU), a wireless connection between the vehicle 110 and the AVM CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles 110 with a server. The vehicle 110 communicates one or more instructions to the vehicle exterior lights 132 based on the AVM algorithm 112c. For example, the vehicle 110 communicates one or more instructions received from the infrastructure 108 to the vehicle exterior lights 132. As another example, the vehicle 110 communicates one or more instructions received directly from the vehicle manufacturing cloud 102 to the vehicle exterior lights 132.

The delivery manager cloud 104 wirelessly communicates (e.g., receives and/or sends instructions and/or information) with one or more of a rental agencies cloud 134, a valet parking agencies cloud 136, an insurance agencies cloud 138, and/or a dealership 140. For example, the delivery manager cloud can facilitate the delivery of the one or more vehicles to any of the rental agencies cloud 134, the valet parking agencies cloud 136, the insurance agencies cloud 138, and/or the dealership 140. The delivery manager cloud 104 also wirelessly communicates with the vehicle customer web-portal account 106. It should be understood that other cloud systems can be included in one or more examples.

The delivery manager cloud 104 wirelessly communicates with a user device 142 such as a mobile device, a display panel, and/or a computer. The vehicle 110 also wirelessly communicates directly with the user device 142. For example, the user 144 engages with the user device 142 via an application that organizes any information and/or instructions received from the vehicle customer web-portal account and/or the vehicle 110. As another example, the user 144 may send one or more instructions to the vehicle customer web-portal account such as making a selection of which vehicle the user 144 would like to receive from any of a rental agency (not shown) associated with the rental agencies cloud 134, a valet parking agency (not shown) associated with the valet parking agencies cloud 136, an insurance agency (not shown) associated with the insurance agencies cloud 138, and/or the dealership 140.

Figure 2:
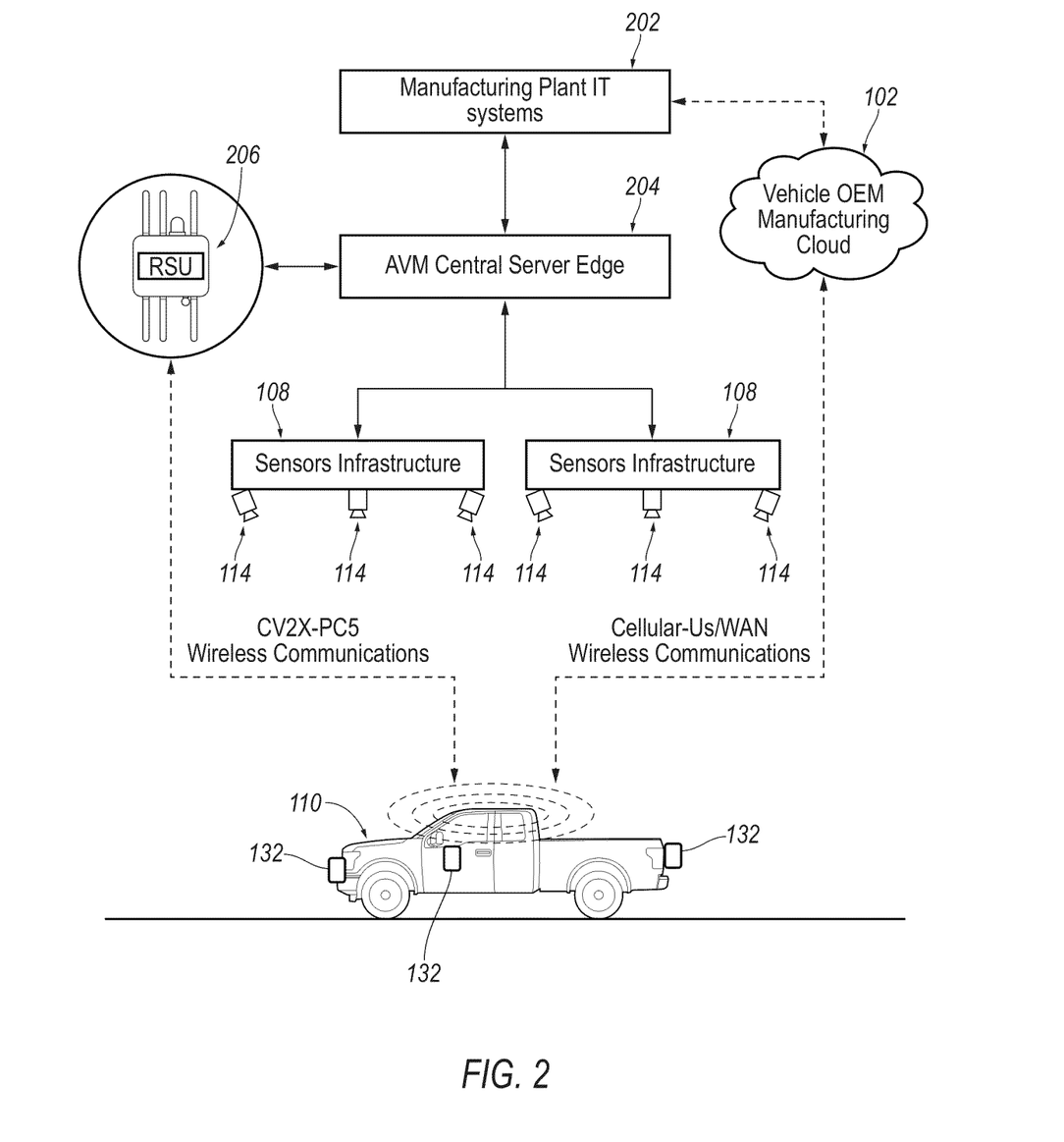
FIG. 2 illustrates an embodiment of the general system for autonomous vehicle marshaling in accordance with various implementations.

FIG. 2 illustrates the engagement of the vehicle 110 with the infrastructure 108. Generally, a manufacturing plant information technology system(s) 202 wirelessly communicates with the vehicle manufacturing system 102. The manufacturing plant information technology system(s) 202 is also connected to an AVM central server edge 204. It is understood that the manufacturing plant information technology system(s) 202 may be wirelessly connected to the AVM central server edge 204, wherein the manufacturing plant information technology system(s) 202 is configured to communicate to the AVM central server edge 204. It is also understood that the manufacturing plant information technology system(s) 202 may be hardwired to the AVM central server edge 204. The AVM central server edge 204 receives one or more signals from the RSU 206. It is understood that the AVM central server edge 204 may be wirelessly connected to the one or more infrastructures (e.g., the infrastructure 108) and is configured to communicate with the one or more infrastructures (e.g., the infrastructure 108). It is also understood that the AVM central server edge 204 may be hardwired to the one or more infrastructures. The vehicle 110 is wirelessly connected to each of the vehicle manufacturing cloud 102 and/or the RSU 206, wherein the vehicle 110 is configured to communicate with each of the vehicle manufacturing cloud 102 and/or the RSU 206.

The one or more infrastructures utilize the AVM algorithm 112b to cause the one or more vehicles to perform various tasks related to the marshaling of the one or more vehicles. For example, the vehicle 110 utilizes the vehicle exterior lights 132 to communicate with the infrastructure 108. The one or more sensors 114 may sense the output from the vehicle 110. For example, the vehicle exterior lights 132 wirelessly communicate with the infrastructure 108 to provide one or more visual notifications (e.g., marshaling status notification)

In one embodiment, the vehicle 110 utilizes the AVM algorithm 112c during a pre-onboarding operational flow related to a current status of the vehicle 110. For example, the current status is indicative of at least one of a wireless connectivity status of the vehicle 110, provisioning of the vehicle 110, onboarding readiness checks of the vehicle 110, and/or pre-onboarding confirmation of the vehicle 110. It is understood that the current status of the vehicle 110 is communicated by the vehicle 110 to the infrastructure 108. For example, the vehicle 110 communicates the vehicle's 110 current status by displaying a patterned light sequence via the vehicle exterior lights 132. As another example, the patterned light sequence may differ based on the current status of the vehicle 110. The patterned light sequence may change the illumination sequence of the exterior lights 132, change a brightness of the exterior lights 132, etc.

The manufacturing plant information technology system(s) 202 sends a pre-onboarding process trigger to the vehicle manufacturing cloud 102. The vehicle manufacturing cloud 102 forwards the pre-onboarding process trigger to the one or more vehicles. The manufacturing plant information technology system(s) 102 also sends the pre-onboarding process trigger to the AVM central server edge 204. The AVM central server edge 204 forwards the pre-onboarding process trigger to the one or more infrastructures. By receiving the pre-onboarding process trigger, the one or more infrastructures is placed in a ready-state to receive various patterned light sequences from the one or more vehicles, via the one or more sensors 114.

The one or more vehicles processes at least one performance check(s) of the vehicle 110. The at least one performance check(s) is processed by the AVM algorithm 112c and includes at least one of a performance of a vehicle provisioning of vehicular modules; a performance of a vehicle wireless connectivity check(s) and status; a performance of a vehicle on-boarding readiness check(s) of vehicle CAN modules; and/or a performance of an AVM feature activation process. The vehicle 110 outputs the current status of the pre-onboarding of the vehicle 110 based on the at least one performance check(s). For example, the vehicle 110 outputs the current status of the pre-onboarding of the vehicle 110 via the vehicle exterior lights 132. The output of the current status of the pre-onboarding of the vehicle 110 includes at least one of a wireless connectivity status of the vehicle 110; a provisioning status of the vehicle 110; and/or a pre-onboarding status of the vehicle 110. It is understood that the output indicative of each of the current statuses of the vehicle 110 may correspond to a different light sequence of the various patterned light sequences. It is also understood that the output is captured by the one or more sensors 114 and that the current status of the vehicle 110 is interpreted by the one or more infrastructures.

In another embodiment, the vehicle 110 utilizes the AVM algorithm 112c during an onboarding operational flow related to a current status of the vehicle 110. For example, the current status is indicative of at least one of a vehicle wireless connectivity status, a vehicle wake-up, and/or onboarding confirmation of the vehicle 110. It is understood that the current status of the vehicle 110 is communicated by the vehicle 110 to the infrastructure 108. For example, the vehicle 110 communicates a current status of the vehicle 110 by displaying a patterned light sequence via the vehicle exterior lights 132. As another example, the patterned light sequence may differ based on the current status of the vehicle 110.

The AVM central server edge 204 initiates an onboarding process trigger based on the pre-onboarding status of the vehicle 110. The onboarding process trigger is received from the one or more vehicles based on the pre-onboarding status of the vehicle 110 via a broadcasted message to the RSU 206. The onboarding process trigger may also be received from the one or more vehicles based on the pre-onboarding status of the vehicle 110 via a cellular message to the vehicle manufacturing cloud 102. The one or more vehicles processes at least one performance check(s) of the vehicle 110. The at least one performance check(s) is processed by the AVM algorithm 112c and includes at least one of a performance of a blinking code challenge as may be specified by the AVM central server edge 204; a performance of a vehicle wireless connectivity check(s) and status, a performance of a vehicle onboarding initializing readiness check; and/or a performance of an AVM feature onboarding activation process. The vehicle 110 outputs the current status of the pre-onboarding of the vehicle 110 based on the at least one performance check(s). For example, the vehicle 110 outputs the current status of the onboarding of the vehicle 110 via the vehicle exterior lights 132. The output of the current status of the onboarding of the vehicle 110 includes at least one of a wireless connectivity status of the vehicle 110; a blinking code challenge performed and sent out as a Parked Vehicle Communication Model (PVCM) message; and/or an onboarding status confirmation of the vehicle 110. It is understood that the output indicative of each of the current statuses of the vehicle 110 may correspond to a different light sequence of the various patterned light sequences. It is also understood that the output is captured by the one or more sensors 114 and interpreted by the one or more infrastructures (i.e., the infrastructure 108).

In a third embodiment, the manufacturing plant information technology system(s) 202 utilizes the AVM algorithm 112c to marshal the one or more vehicles by using either a PCIM message and/or a PCVM message. However, it is understood that the manufacturing plant information technology system(s) 202 may use any message to marshal the one or more vehicles. For example, in the instance wherein PCIM messaging is used, the vehicle 110 utilizes the AVM algorithm 112c during marshaling messages received from the one or more infrastructures to display a status of the received PCIM message of the vehicle 110 via the vehicle exterior lights 132. As another example, the status of the received PCIM message includes at least one of a counter received and/or an emergency stop status. Additionally, in the instance wherein PCVM messaging is used, the vehicle 110 utilizes the AVM algorithm 112c during marshaling messages received from the one or more infrastructures to display a marshaling acknowledgement of the vehicle 110 via the vehicle exterior lights 132, for example. As another example, the marshaling acknowledgement includes at least one of a counter, odometry details, an emergency stop status, and/or vehicle RF signal strength status details.

In the instance wherein one or more signals are broadcasted from the manufacturing plant information technology system(s) 202, the PCIM messages are utilized. The AVM central server edge 204 sends a PCIM broadcast to the RSU 206 so that a marshaling sequence is initialized. It is understood that the PCIM broadcast is a marshaling sequence. The vehicle 110 utilizes the AVM algorithm 112c to send a response back to the marshaling sequence received from the RSU 206 using PCVM messaging. The vehicle 110 also utilizes the AVM algorithm 112c to send odometry-related details and/or heart-beat-related details to the RSU 206 using PCVM messaging. The vehicle 110 outputs the current status of the PCIM reception over PC5 via the exterior lights 132. The vehicle 110 also outputs the PCVM identifier via the exterior lights 132. Additionally, the vehicle 110 outputs the counter over PC5. It is understood that the output indicative of each of the current statuses of the vehicle 110 may correspond to a different light sequence (e.g., different blinking or on/off sequence) of the various patterned light sequences. It is also understood that the output is captured by the one or more sensors 114 and that the current status of the vehicle 110 is interpreted by the one or more infrastructures.

In the instance wherein the one or more vehicles request PCIM directly from the AVM central server edge 204, one or more signals are exchanged between the one or more vehicles and the AVM central server edge 204 via a cellular pathway that initiates a marshaling sequence. The vehicle 110 utilizes the AVM algorithm 112c to process the PCIM received back from the AVM central server edge 204. The vehicle also utilizes the AVM algorithm 112c to post PCVM directly to the AVM central server edge 204 directly. For example, the AVM algorithm 112c to post PCVM directly to the AVM central server edge 204 directly when one or more submodules that host a feature code have confirmed that their feature specific aspects are fully functional without errors. The vehicle 110 outputs the current status of the PCIM request and/or the PCIM response via a cellular pathway. The vehicle 110 also outputs the PCVM identifier and counter that is sent over the cellular pathway. It is understood that the output indicative of each of the current statuses of the vehicle 110 may correspond to a different light sequence of the various patterned light sequences. It is also understood that the output is captured by the one or more sensors 114 and interpreted by the one or more infrastructures.

In another embodiment, the manufacturing plant information technology system(s) 202 utilizes the AVM algorithm 112c during a re-onboarding operational flow related to a current status of the vehicle 110. For example, the current status is indicative of at least one of a status of re-onboarding initialization condition(s) of the vehicle 110; a check performed via the vehicle 110; a wireless connectivity status of the vehicle; and/or a re-onboarding confirmation of the vehicle 110. It is understood that the re-onboarding operational flow is based on any aspect of the entirety of the third embodiment. It is understood that the current status of the vehicle 110 is communicated by the vehicle 110 to the infrastructure 108. For example, the vehicle 110 communicates the current status of the vehicle 110 by displaying a patterned light sequence via the vehicle exterior lights 132. As another example, the patterned light sequence may differ based on the current status of the vehicle 110.

In another embodiment, the vehicle 110 utilizes the AVM algorithm 112c during an off-boarding operational flow related to a current status of the vehicle 110 as part of one or more off-boarding final checks to ensure disconnection of the vehicle 110 from the marshaling sequence. For example, the disconnection of the vehicle 110 can be initiated by the one or more infrastructures. Additionally, the disconnection of the vehicle 110 can be temporary or permanent. As another example, the current status is indicative of an off-boarding confirmation. It is understood that the current status of the vehicle 110 is communicated by the vehicle 110 to the infrastructure 108. For example, the vehicle 110 communicates the current status of the vehicle 110 by displaying a patterned light sequence via the vehicle exterior lights 132. As another example, the patterned light sequence may differ based on the current status of the vehicle 110.

The AVM central server edge 204 initiates the offboarding of a vehicle 110 by sending one or more signals to the manufacturing plant information technology system(s) 202. The manufacturing plant information technology system(s) 202 forwards the one or more signals to the vehicle 110. The AVM central server edge 204 also sends the one or more signals to the RSU 206. The RSU 206 forwards the one or more signals to the vehicle 110. The one or more vehicles processes at least one performance check(s) of the vehicle 110. The performance check(s) is processed by the AVM algorithm 112c and includes at least one of a performance of a wireless connectivity check(s) and status of the vehicle 110; a performance of an off-boarding readiness check of vehicle CAN modules associated with the vehicle 110; and/or a performance of the AVM feature de-activation process of the vehicle 110. The vehicle 110 outputs the current status of the offboarding of the vehicle 110 based on the at least one performance check(s). For example, the vehicle 110 outputs the current status of the offboarding of the vehicle 110 via the vehicle exterior lights 132. It is understood that the output indicative of each of the current statuses of the vehicle 110 may correspond to a different light sequence of the various patterned light sequences. It is also understood that the output is captured by the one or more sensors 114 and interpreted by the one or more infrastructures.

Figure 3A:
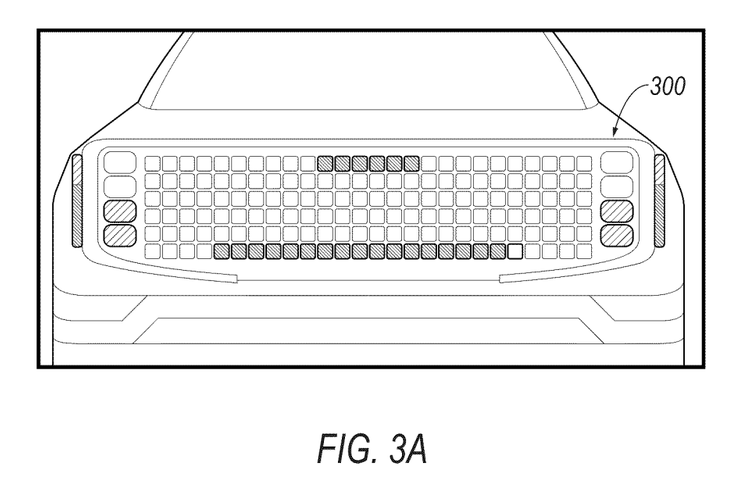
FIGS. 3A-3F illustrates different blinking patterns of exterior lights of a vehicle in accordance with various implementations.
Figure 3B:
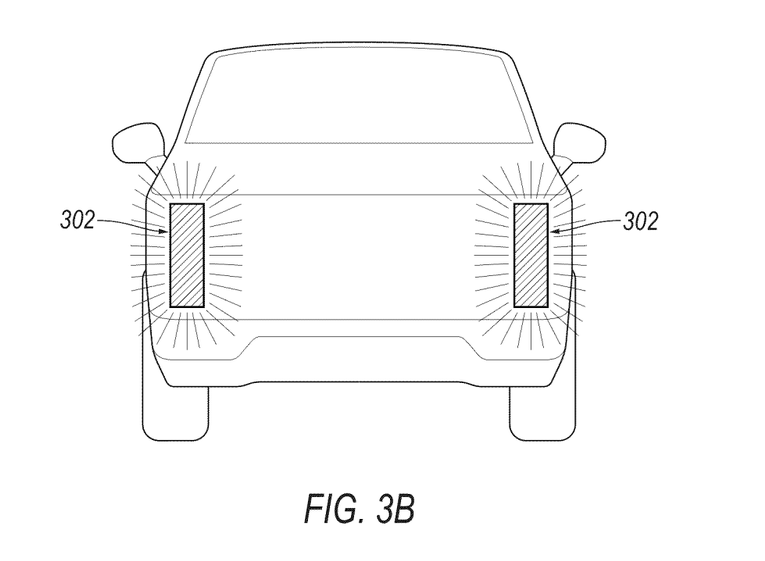
Figure 3C:
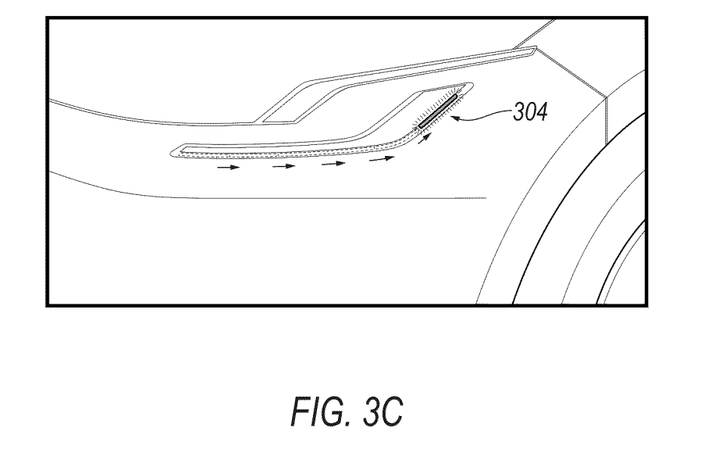
Figure 3D:
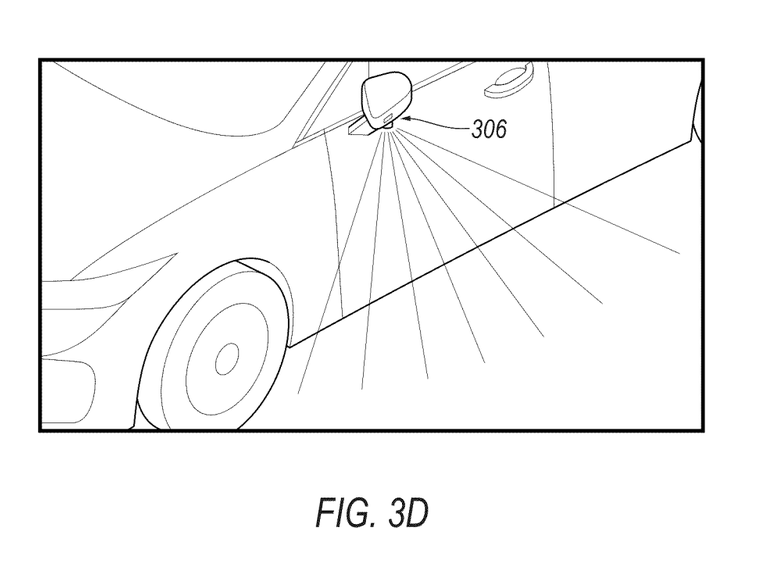
Figure 3E:
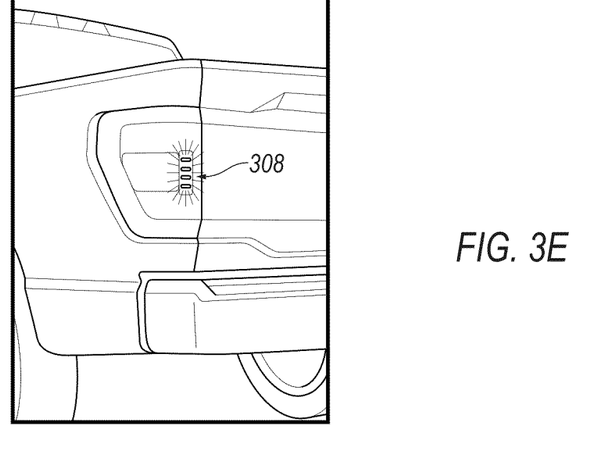
Figure 3F:
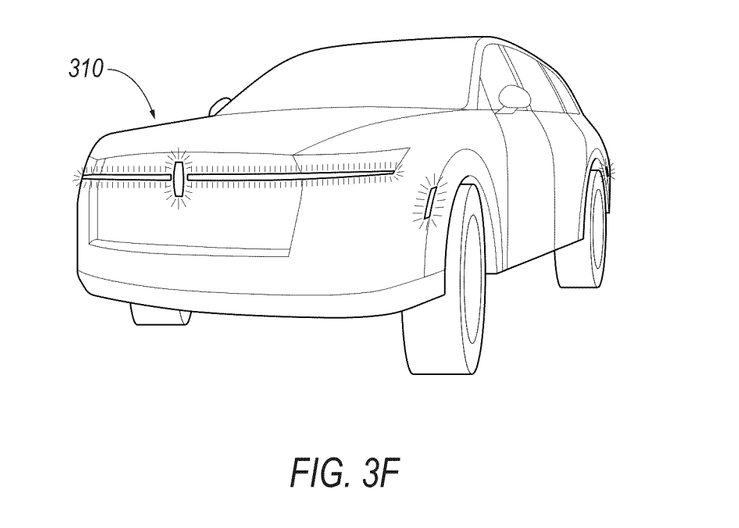

FIGS. 3A-3F illustrate examples of different blinking patterns of the exterior vehicle lights 132. For example, FIG. 3A illustrates activation of the vehicle's 110 front light panel in a light pattern 300 indicating onboarding success. As another example, FIG. 3A also illustrates activation of the vehicle's 110 front light panel in the light pattern 300 displaying AVM status via the front light panel. It is understood that the light pattern 300 is a stationary light pattern with spaced apart activated lights of the vehicle 110 in vertical and horizontal orientations. As an additional example, FIG. 3B illustrates activation of the vehicle's 110 front light panel in a light pattern 302 displaying a blinking pattern, code, and/or sequence. It is understood that the light pattern 302 is a stationary light pattern relative to the activation of both headlights of the vehicle 110. For example, FIG. 3C illustrates activation of the vehicle's 110 front light panel in a light pattern 304 displaying an AVM pattern. It is understood that the light pattern 304 is a dynamic (e.g., moving) light pattern relative to the activation of both headlights of the vehicle 110. As another example, FIG. 3D illustrates activation of the vehicle's 110 side door lights in a light pattern 306 indicating a status of AVM wireless connectivity. As an additional example, FIG. 3D also illustrates the light pattern 306 displaying an indication of the status of AVM wireless connectivity via the vehicle's 110 side door lights. It is understood that the light pattern 306 is a stationary light pattern relative to the activation of both the vehicle's 110 side door lights. As yet another example, FIG. 3E illustrates activation of the vehicle's 110 rear lights in a light pattern 308 indicating AVM status via light bars. For example, the vehicle 110 can display four rear light bars to indicate success; three rear light bars to indicate in-progress; two rear light bars to indicate a failure; and one rear light bar to indicate an emergency stop. It is understood that the activation of the four rear light bars relative to the light pattern 308 is a stationary light pattern. As still another example, FIG. 3F illustrates a deactivation of the vehicle's 110 side door lights in a light pattern 310 to indicate a failure of AVM wireless connectivity. It is understood that while the vehicle's 110 side door lights may be deactivated relative to the light pattern 310, other vehicle exterior lights 132 may be activated (e.g., a front light bar and/or fender-adjacent lights). It is also understood that each of the light patterns shown in FIGS. 3A-3F can be any display pattern of the vehicle exterior lights 132, and may be stationary or dynamic, that may communicate any status to any sensing entity (e.g., the one or more infrastructures and/or one or more human operators).

Figure 4:
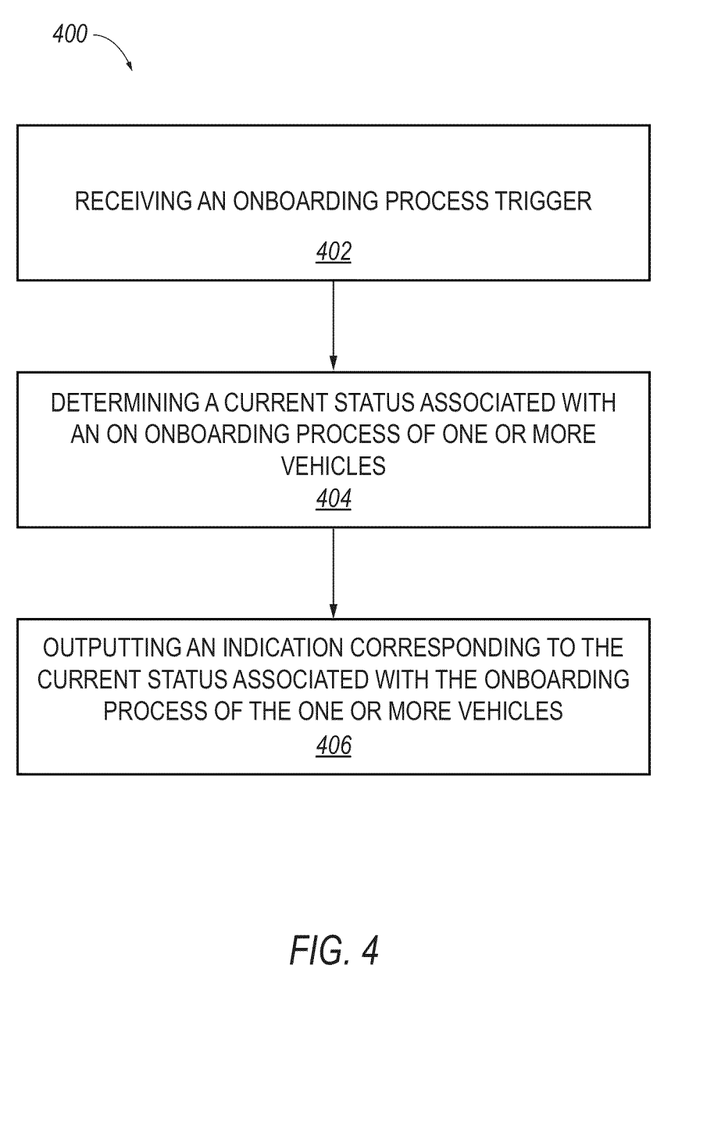
FIG. 4 is a flowchart illustrating an example method for a vehicle to wirelessly communicate with an infrastructure in accordance with various implementations.

FIG. 4 is a flowchart illustrating an example method 400 for wirelessly communicating status information of the one or more vehicles to the one or more infrastructures. At step 402 an onboarding process trigger is received. For example, the receipt of the onboarding process trigger is based on a current status. As another example, the current status is associated with a pre-onboarding process of the one or more vehicles. Additionally, the current status associated with the pre-onboarding indicates one or more of a wireless connectivity status, a provisioning status, or a pre-onboarding status, for example.

At step 404, a current status associated with an onboarding process of the one or more vehicles is determined. For example, the current status associated with the onboarding process of the one or more vehicles (i.e., the vehicle 110) is based on the onboarding process trigger. As another example, the current status associated with the onboarding process of the one or more vehicles is based on one or more AVM algorithms, such as described in more detail herein. For example, the current status associated with the onboarding process indicates one or more of a wireless connectivity status, a blinking code sequence, or an onboarding status confirmation. As another example, the AVM algorithm used in determining the current status associated with the onboarding process is configured to perform one or more diagnostic processes, wherein the one or more diagnostic processes is a blinking code sequence, a vehicle wireless connectivity check and status, a vehicle on-boarding initialization readiness check, an AVM feature activation process, or a combination thereof.

At step 406, an indication corresponding to the current status associated with the onboarding process of the one or more vehicles is outputted. For example, the indication corresponding to the current status associated with the onboarding process of the one or more vehicles is outputted via exterior lights of the one or more vehicles to the one or more infrastructures. As another example, the indication corresponding to the current status associated with the onboarding process of the one or more vehicles is outputted via exterior lights of the one or more vehicles to the one or more human operators. As yet another example, the indication corresponding to the current status associated with the onboarding process of the one or more vehicles is outputted via exterior lights of the one or more vehicles to the one or more infrastructures and/or the one or more human operators. Additionally, the indication is a visual cue that corresponds to a current status associated with the onboarding process, a pre-onboarding process, a re-onboarding process, or an offboarding process of the one or more vehicles, wherein the visual cue includes a pre-defined pattern of a plurality of patterns for example.

In one or more embodiments, a pre-onboarding process trigger is received. For example, a current status associated with a pre-onboarding process of the one or more vehicles is determined. As another example, the current status associated with a pre-onboarding process of the one or more vehicles is determined based on the pre-onboarding process trigger and the AVM algorithm. Additionally, the AVM algorithm used in determining the current status associated with the pre-onboarding process is configured to perform one or more diagnostic processes, wherein the one or more diagnostic processes is a vehicle provisioning of vehicular modules, a wireless connectivity check and status, an onboarding readiness check of vehicle CAN modules, an AVM feature activation process, or a combination thereof, for example. As another example, an indication corresponding to the current status associated with the pre-onboarding process of the one or more vehicles is outputted. For example, the indication corresponding to the current status associated with the pre-onboarding process of the one or more vehicles is outputted via the exterior lights of the one or more vehicles to the one or more infrastructures.

In another embodiment, navigation of the one or more vehicles is halted. For example, navigation of the one or more vehicles is halted based on one or more faults associated with the one or more vehicles. As another example, the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and the autonomous vehicle marshaling CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles with a server, or a combination thereof. For example, an indication corresponding to a current status associated with the one or more faults is outputted. As another example, an indication corresponding to a current status associated with the one or more faults is outputted via the exterior lights of the one or more vehicles to the one or more infrastructures. Additionally, the indication corresponding to a current status associated with the one or more faults is outputted via the exterior lights of the one or more vehicles to the one or more infrastructures based on the one or more faults. For example, a re-onboarding process trigger is received. As another example, the re-onboarding process trigger is received based on the one or more faults. For example, a current status associated with a re-onboarding process of the one or more vehicles is determined. As another example, the current status associated with a re-onboarding process of the one or more vehicles is determined based on the re-onboarding process trigger. Additionally, the current status associated with a re-onboarding process of the one or more vehicles is determined based on AVM algorithm. For example, an indication corresponding to the current status associated with the re-onboarding process of the one or more vehicles is outputted. As another example, the indication corresponding to the current status associated with the re-onboarding process of the one or more vehicles is outputted via the exterior lights of the one or more vehicles to the one or more infrastructures.

In additional embodiment, an offboarding process trigger is received. For example, the offboarding process trigger is received from a server. As another example, a current status associated with an off-boarding process of the one or more vehicles is determined. Additionally, the current status associated with an off-boarding process of the one or more vehicles is determined based on the offboarding process trigger. For example, the current status associated with an off-boarding process of the one or more vehicles is determined based on an AVM algorithm. As another example, an indication corresponding to the current status associated with the offboarding process of the one or more vehicles is outputted. Additionally, the indication corresponding to the current status associated with the offboarding process of the one or more vehicles is outputted via the exterior lights of the one or more vehicles (to the one or more infrastructures. For example, the AVM algorithm used in determining the current status associated with the offboarding process is configured to perform a wireless connectivity check and status, an off-boarding readiness check of vehicle CAN modules, an AVM feature deactivation process, or a combination thereof.

Figure 5:
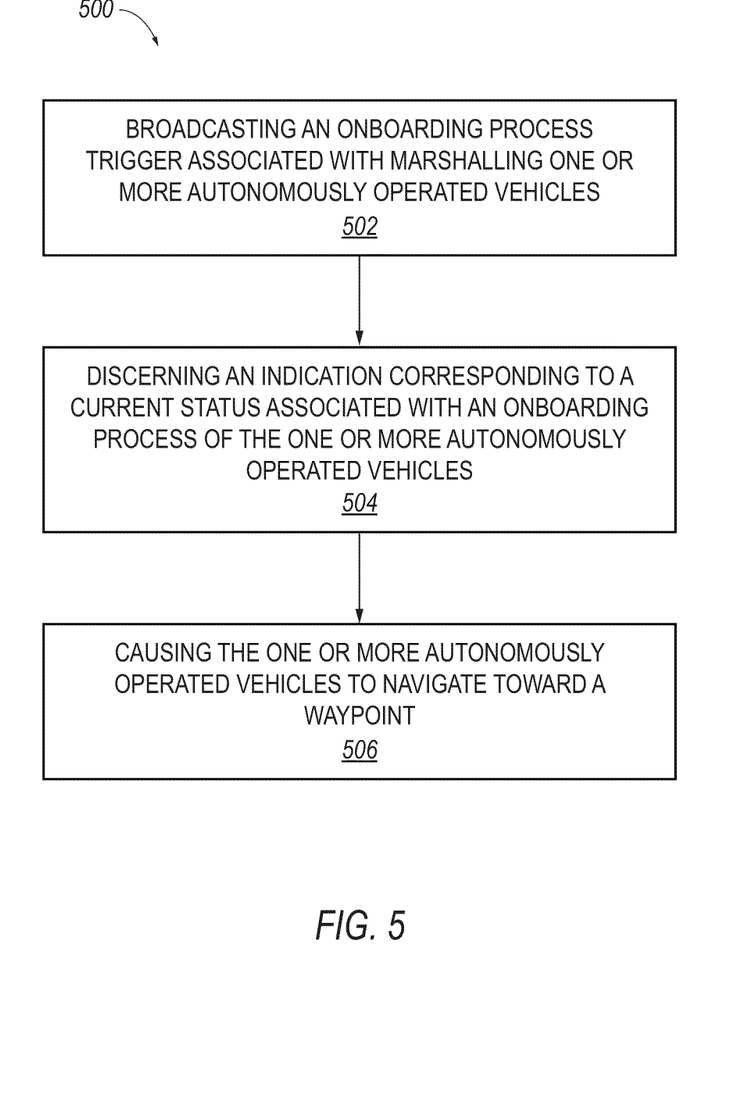
FIG. 5 is a flowchart illustrating another example method for a vehicle to wirelessly communicate with an infrastructure in accordance with various implementations.

FIG. 5 is a flowchart illustrating another example method 500 for wirelessly communicating status information of one or more autonomously operated vehicles to the one or more infrastructures. At step 502 an onboarding process trigger is broadcasted to the one or more autonomously operated vehicles. For example, the onboarding process trigger is associated with marshaling the one or more autonomously operated vehicles. As another example, the broadcasted onboarding process trigger is sent via a short-range wireless communication method. In an embodiment, one or more faults associated with the one or more autonomously operated vehicles with a server is determined. One or more signals are re-broadcasted. For example, the one or more signals are re-broadcasted from the one or more autonomously operated vehicles via a long-range wireless communication method. As another example, the one or more signals is the onboarding process trigger, a pre-onboarding process trigger, a re-onboarding process trigger, and/or an offboarding process trigger. Additionally, the one or more signals that are re-broadcasted are sent to the one or more infrastructures. For example, the one or more signals are re-broadcasted is based on the one or more faults. As another example, the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and the autonomous vehicle marshaling CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles with a server, or a combination thereof.

At 504, an indication is discerned. As an example, the indication is identified by the one or more infrastructures. For example, the indication is discerned based on the onboarding process trigger and one or more AVM algorithms. As another example, the indication corresponds to a current status associated with an onboarding process of the one or more autonomously operated vehicles. Additionally, the indication is outputted via exterior lights (e.g., the exterior vehicle lights 132) of the one or more autonomously operated vehicles (e.g., the vehicle 110) to one or more infrastructures (e.g., the infrastructure 108), for example. As another example, the indication is outputted via exterior lights of the one or more autonomously operated vehicles to the one or more human operators. As yet another example, the indication is outputted via exterior lights of the one or more autonomously operated vehicles to the one or more infrastructures and/or the one or more human operators. For example, the current status associated with the onboarding process indicates one or more of a wireless connectivity status, a blinking code sequence, or an onboarding status confirmation.

At step 506, the one or more autonomously operated vehicles are caused to navigate toward a waypoint. For example, the one or more autonomously operated vehicles are caused to navigate toward the waypoint based on the indication.

In an embodiment a pre-onboarding process trigger is broadcasted. For example, the pre-onboarding process trigger is broadcasted to the one or more autonomously operated vehicles. An indication is discerned. As an example, the indication is identified by the one or more infrastructures. For example, discerning the indication is based on the pre-onboarding process trigger. As another example, discerning the indication is based on the AVM algorithm. Additionally, the indication corresponds to a current status associated with a pre-onboarding process of the one or more autonomously operated vehicles. For example, the indication is outputted via the exterior lights of the one or more autonomously operated vehicles to the one or more infrastructures. As another example, the current status associated with the pre-onboarding process indicates one or more of a wireless connectivity status, a provisioning status, or a pre-onboarding status.

In another embodiment, one or more faults associated with the one or more autonomously operated vehicles are determined. For example, the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and the autonomous vehicle marshaling CS, a cellular signal of a marshaling status; an enablement of a CV2X-PC5 congestion state; an expiration of one or more vehicle security certifications; an occurrence of a latency delay between wireless messages; and a disrupted wireless connection of the one or more vehicles with a server, or a combination thereof. The one or more autonomously operated vehicles are caused to halt navigation toward the waypoint. For example, the one or more autonomously operated vehicles are caused to halt navigation toward the waypoint based on the one or more faults. A re-onboarding process trigger is broadcasted. For example, the re-onboarding process trigger is broadcasted based on the one or more faults. An indication is discerned. As an example, the indication is identified by the one or more infrastructures. For example, the indication is discerned based on the re-onboarding process trigger. As another example, the indication is discerned based on the re-onboarding process trigger is based on the AVM algorithm. Additionally, the indication corresponds to a current status associated with a re-onboarding process of the one or more autonomously operated vehicles, for example. For example, the indication is outputted via the exterior lights of the one or more autonomously operated vehicles to the one or more infrastructures.

In an additional embodiment, an offboarding process trigger is broadcasted. An indication is discerned. As an example, the indication is identified by the one or more infrastructures. For example, the indication corresponds to a current status associated with an offboarding process of the one or more autonomously operated vehicles. As another example, the indication is outputted via the exterior lights of the one or more autonomously operated vehicles to the one or more infrastructures.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of wirelessly communicating status information of one or more vehicles with one or more infrastructures, the method comprising:
   receiving, based on a current status associated with a pre-onboarding process of the one or more vehicles, an onboarding process trigger via a message broadcasted from a server or from the one or more vehicles;
   determining, based on the onboarding process trigger and an autonomous vehicle marshaling algorithm, a current status associated with an onboarding process of the one or more vehicles; and
   outputting, via exterior lights of the one or more vehicles to at least one of the one or more infrastructures or one or more human operators, an indication corresponding to the current status associated with the onboarding process of the one or more vehicles.

2. The method of claim 1, wherein the current status associated with the pre-onboarding process indicates one or more of a wireless connectivity status, a provisioning status, or a pre-onboarding status.

3. The method of claim 1, wherein the current status associated with the onboarding process indicates one or more of a wireless connectivity status, a blinking code sequence, or an onboarding status confirmation.

4. The method of claim 1, wherein the autonomous vehicle marshaling algorithm used in determining the current status associated with the onboarding process is configured to perform one or more diagnostic processes, wherein the one or more diagnostic processes is a blinking code sequence, a vehicle wireless connectivity check and status, a vehicle on-boarding initialization readiness check, an autonomous vehicle marshaling ("AVM") feature activation process, or a combination thereof.

5. The method of claim 1, further comprising:
   receiving, from the server, a pre-onboarding process trigger;
   determining, based on the pre-onboarding process trigger and the autonomous vehicle marshaling algorithm, the current status associated with the pre-onboarding process of the one or more vehicles, wherein the autonomous vehicle marshaling algorithm used in determining the current status associated with the pre-onboarding process is configured to perform one or more diagnostic processes, wherein the one or more diagnostic processes is a vehicle provisioning of vehicular modules, a wireless connectivity check and status, an on-boarding readiness check of vehicle CAN modules, an autonomous vehicle marshaling ("AVM") feature activation process, or a combination thereof; and
   outputting, via the exterior lights of the one or more vehicles to the one or more infrastructures, an indication corresponding to the current status associated with the pre-onboarding process of the one or more vehicles.

6. The method of claim 1, further comprising:
   halting, based on one or more faults associated with the one or more vehicles, navigation of the one more vehicles toward a waypoint, wherein the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and an autonomous vehicle marshaling central server ("CS"), a cellular signal of a marshaling status; an enablement of a Cellular Vehicle-to-Everythinq ("CV2X-PC5") congestion state; an expiration of one or more vehicle security certifications; an occurrence of a latency delay between wireless messages; and a disrupted wireless connection of the one or more vehicles with the server, or a combination thereof; and
   outputting, via the exterior lights of the one or more vehicles to the one or more infrastructures based on the one or more faults, an indication corresponding to a current status associated with the one or more faults.

7. The method of claim 6, further comprising:
   receiving, based on the one or more faults, a re-onboarding process trigger;
   determining, based on the re-onboarding process trigger and the autonomous vehicle marshaling algorithm, a current status associated with a re-onboarding process of the one or more vehicles; and
   outputting, via the exterior lights of the one or more vehicles to the one or more infrastructures, an indication corresponding to the current status associated with the re-onboarding process of the one or more vehicles.

8. The method of claim 1, further comprising:
   receiving, from the server, an offboarding process trigger;
   determining, based on the offboarding process trigger and the autonomous vehicle marshaling algorithm, a current status associated with an off-boarding process of the one or more vehicles; and
   outputting, via the exterior lights of the one or more vehicles to the one or more infrastructures, an indication corresponding to the current status associated with the offboarding process of the one or more vehicles.

9. The method of claim 8, wherein the autonomous vehicle marshaling algorithm used in determining the current status associated with the offboarding process is configured to perform a wireless connectivity check and status, an off-boarding readiness check of vehicle CAN modules, an autonomous vehicle marshaling ("AVM") feature deactivation process, or a combination thereof.

10. The method of claim 1, wherein the indication is a visual cue that corresponds to the current status associated with the onboarding process, the pre-onboarding process, a re-onboarding process, or an offboarding process of the one or more vehicles, wherein the visual cue includes a predefined pattern of a plurality of patterns.

11. A method of marshaling one or more autonomously operated vehicles, the method comprising:
   broadcasting, to one or more vehicles, an onboarding process trigger via a message broadcasted from a server or from the one or more vehicles, the onboarding process trigger being associated with marshaling the one or more autonomously operated vehicles;
   discerning, based on the onboarding process trigger and an autonomous vehicle marshaling algorithm, an indication corresponding to a current status associated with an onboarding process of the one or more autonomously operated vehicles, wherein the indication is outputted via exterior lights of the one or more autonomously operated vehicles to one or more infrastructures or one or more human operators; and causing, based on the indication, the one or more autonomously operated vehicles to navigate toward a waypoint.

12. The method of claim 11, wherein the current status associated with the onboarding process indicates one or more of a wireless connectivity status, a blinking code sequence, or an onboarding status confirmation.

13. The method of claim 11, further comprising:
broadcasting, to the one or more autonomously operated vehicles, a pre-onboarding process trigger; and
discerning, based on the pre-onboarding process trigger and the autonomous vehicle marshaling algorithm, an indication corresponding to a current status associated with a pre-onboarding process of the one or more autonomously operated vehicles, wherein the indication is outputted via the exterior lights of the one or more autonomously operated vehicles to the one or more infrastructures.

14. The method of claim 13, wherein the current status associated with the pre-onboarding process indicates one or more of a wireless connectivity status, a provisioning status, or a pre-onboarding status.

15. The method of claim 11, further comprising:
determining one or more faults associated with the one or more autonomously operated vehicles, wherein the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and an autonomous vehicle marshaling central server ("CS"), a cellular signal of a marshaling status; an enablement of a Cellular Vehicle-to-Everythinq ("CV2X-PC5") congestion state; an expiration of one or more vehicle security certifications; an occurrence of a latency delay between wireless messages; and a disrupted wireless connection of the one or more vehicles with the server, or a combination thereof; and
causing, based on the one or more faults, the one or more autonomously operated vehicles to halt navigation toward the waypoint.

16. The method of claim 15, further comprising:
broadcasting, based on the one or more faults, a re-onboarding process trigger; and
discerning, based on the re-onboarding process trigger and the autonomous vehicle marshaling algorithm, an indication corresponding to a current status associated with a re-onboarding process of the one or more autonomously operated vehicles, wherein the indication is outputted via the exterior lights of the one or more autonomously operated vehicles to the one or more infrastructures.

17. The method of claim 11, further comprising:
broadcasting an offboarding process trigger; and
discerning, based on the offboarding process trigger and the autonomous vehicle marshaling algorithm, an indication corresponding to a current status associated with an offboarding process of the one or more autonomously operated vehicles, wherein the indication is outputted via the exterior lights of the one or more autonomously operated vehicles to the one or more infrastructures.

18. The method of claim 1, wherein the broadcasted onboarding process trigger is sent via a short-range wireless communication method.

19. The method of claim 18, further comprising:
determining, one or more faults associated with the one or more autonomously operated vehicles with the server; and
re-broadcasting, to the one or more infrastructures based on the one or more faults, one or more signals from the one or more autonomously operated vehicles via a long-range wireless communication method, wherein the one or more faults include a failure associated with a pre-onboarding status, an onboarding status, an autonomous vehicle marshaling feature activation, a vehicle key detection, a blinking challenge, a vehicle global navigation satellite system time synchronization, an onboarding readiness check, vehicle security certifications, a re-onboarding status, an offboarding status, a wireless connection between the vehicle and a roadside unit, a wireless connection between the vehicle and an autonomous vehicle marshaling central server ("CS"), a cellular signal of a marshaling status; an enablement of a Cellular Vehicle-to-Everything ("CV2X-PC5") congestion state; an expiration of one or more vehicle security certifications; an occurrence of a latency delay between wireless messages; and a disrupted wireless connection of the one or more vehicles with the server, or a combination thereof, and wherein the one or more signals is the onboarding process trigger, a pre-onboarding process trigger, a re-onboarding process trigger, or an offboarding process trigger.

20. A system for wirelessly communicating status information of one or more vehicles with one or more infrastructures, the system comprising:
the one or more vehicles configured to:
receive, based on a current status associated with a pre-onboarding process of the one or more vehicles, an onboarding process trigger via a message broadcasted from the one or more vehicles,
determine, based on the onboarding process trigger and an autonomous vehicle marshaling algorithm, a current status associated with an onboarding process of the one or more vehicles, and
output, via exterior lights of the one or more vehicles to the one or more infrastructures or one or more human operators, an indication corresponding to the current status associated with the onboarding process of the one or more vehicles; and
a server configured to:
broadcast, to the one or more vehicles, the onboarding process trigger associated with marshaling the one or more vehicles,
discern, based on the onboarding process trigger and the autonomous vehicle marshaling algorithm, an indication corresponding to the current status associated with an onboarding process of the one or more vehicles, wherein the indication is outputted via the exterior lights of the one or more vehicles to the one or more infrastructures, and
cause, based on the indication, the one or more vehicles to navigate toward a waypoint.

* * * * *